United States Patent

[11] 3,546,437

[72] Inventor Peter Bruno Steghart
 Buckinghamshire, England
[21] Appl. No. 685,345
[22] Filed Nov. 24, 1967
[45] Patented Dec. 8, 1970
[73] Assignee Aktiengesellschaft fuer Technische Studien
 Zurich, Switzerland
 a company of Switzerland
[32] Priority Dec. 5, 1966, Jan. 18, 1967, May 23, 1967
[33] Great Britain
[31] Nos. 54.317/66, 2.661/67 and 23806/67

[54] AUTOMATIC CONTROL SYSTEMS
 19 Claims, 15 Drawing Figs.
[52] U.S. Cl. .................................................. 219/511,
 337/139
[51] Int. Cl. .................................................. H05b 1/02
[50] Field of Search .................................................. 337/139,
 324, 326, 393, 416; 73/368.2; 219/501, (Cursory),
 511

[56] References Cited
UNITED STATES PATENTS
| | | | |
|---|---|---|---|
| 1,595,749 | 8/1926 | Andersen | |
| 3,131,269 | 4/1964 | Asakawa | 337/139 |
| 3,212,337 | 10/1965 | McCarrick | 337/393 |
| 3,374,337 | 3/1968 | Burley | 219/501 |

FOREIGN PATENTS
| | | | |
|---|---|---|---|
| 878,832 | 10/1961 | Great Britain | 337/139 |

Primary Examiner—Bernard A. Gilheany
Assistant Examiner—F. E. Bell
Attorney—Jones and Lockwood ABSTRACT: A control system including either an electronic or a mechanical controller and an electrothermal actuator which is controlled from the output of the controller to effect the control of a physical magnitude of a process, the controller receiving an error signal from a detector measuring the physical magnitude and a feedback signal from the actuator. The actuator has an actuating element partly protruding from a gland in one end thereof, electrical heaters provided at the other end thereof operated in accordance with a time-modulated mode from the output of the controller, a wax located within the casing of the actuator which is caused to expand or contract in accordance with the time-modulated mode to effect the desired control of the physical magnitude, this being achieved by maintaining a sufficient temperature difference between a localized area heated by the heaters of the actuator and the gland so that the melting point of the wax is not reached in the region of the gland.

PATENTED DEC 8 1970

AUTOMATIC CONTROL SYSTEMS

This invention relates generally to automatic control systems which include electrothermal actuators. Thermal actuators as such are well known and are used, for instance, to control the flow of liquid as a function of the temperature by operating a valve by means of a temperature-responsive element, for instance, bellows.

Electrothermal actuators are operated by heating a thermal element, for instance a wax that expands with heat generated by means of an electric current. These actuators have the considerable advantage that they work silently and if properly laid out have a very long life. On the other hand this type of actuator has a considerable heat capacity and the response is therefore very slow. The greatest problem connected with these cheap and efficient actuators is that of leakage. In most of the modern designs one form or another of wax is used and apart from the leakage problem has proved to be very effective due to its very considerable coefficient of expansion with increasing temperature. The wax is heated and when it starts to melt it can be used to push a piston out of a container so that the piston can operate a fluid valve or exert another control function. The pressure in an economic expansion actuator is however very large, up to 10,000 pounds per square inch or even more and unless the wax is kept permanently enclosed without leakage of any kind the actuator is practically useless. No ordinary seal on which no servicing of any kind is possible holds a hot liquid under such pressure without a leakage developing sooner or later.

According to the present invention there is provided a control system including an actuator adapted to effect the control of a physical magnitude of a process, comprising a controller receiving at least one error signal from a detector measuring the physical magnitude, and a feedback signal; an actuator comprising a casing, an actuating element partly protruding from the casing in order to operate a correcting element, a gland sealing the actuating element within a hole in the casing through which it operates, means for urging the actuating element to its withdrawn position, a medium that expands with temperature and becomes liquid, means for electrically heating the medium, means for switching the current to the electrical heating means on and off in accordance with a time-modulated mode which is controlled by the error signal, whereby the medium is caused to expand or contract to effect the desired control of the physical magnitude, characterized in that a sufficient temperature difference is maintained between a localized area (*f*6, *f*7A/414; *f*7C/435; *f*9A/655; *f*10/656) heated by said electrical heating means and said gland (*f*6, *f*7A/411; *f*7 C/434; *f*9A/607—614; *f*10/633) to keep the temperature at said gland below its melting point.

Preferably the medium used in the actuator is polyethylene wax.

The present invention will now be described in greater detail by way of examples with reference to the accompanying drawings, wherein.

Figure 1:
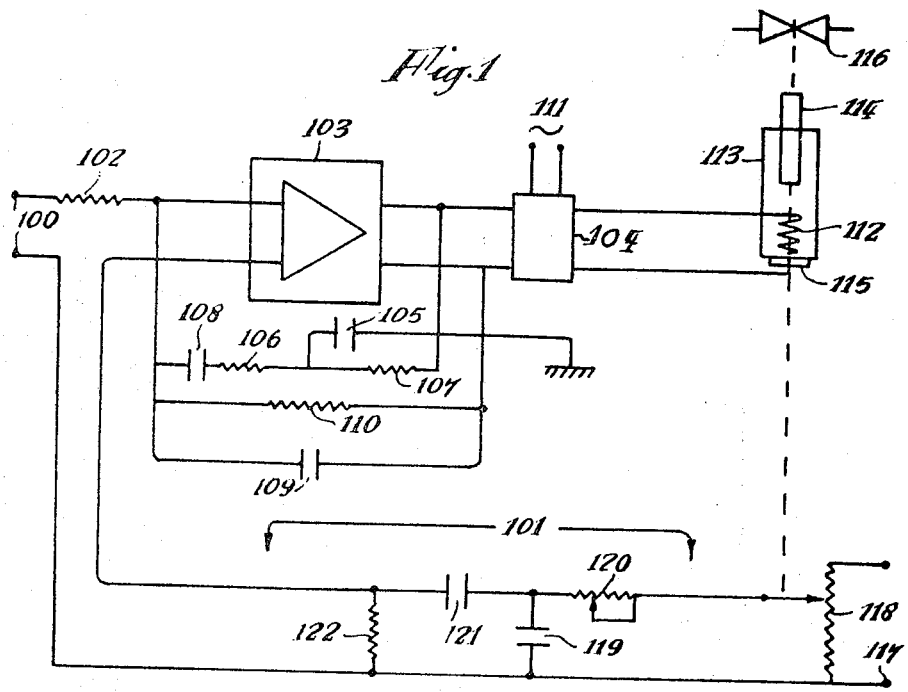
FIG. 1 is a circuit diagram of one form of an electronic controller.

One form of controller is shown in FIG. 1. An input error signal is fed to a pair of terminals 100 and in combination with a feedback circuit 101 via a resistor 102 is connected to an amplifier 103, which has a feedback network of its own and the output of which operates the switch 104. The output of the amplifier 103 operates three feedback circuits which are superimposed on each other. The first feedback circuit is made up of a capacitor 105 and the resistors 106 and 107 in combination with the previously mentioned resistor 102. The error voltage of the terminal 100 (leaving out for the time being the effect of the feedback in the circuit 101) will produce at the output terminals of the amplifier 103 a continuously varying output including a component which is proportional to and a component which is a derivative of the error signal. A capacitor 108 is not necessary for the operation of a standard circuit and is therefore only indicated in dotted lines. The effect of including the capacitor 108 would be to obtain a proportional/integral/derivative output signal on the output terminals of the amplifier 103. The use of the capacitor 108 therefore changes the proportional/derivative signal into an proportional/integral/derivative signal. Superimposed on the controller as described up to now—and which works entirely by means of a negative feedback—is another feedback circuit consisting of a capacitor 109 and a resistor 110 in parallel. This is a positive feedback circuit which has the effect of making the amplifier circuit unstable and produces a maximum output on the part of the amplifier only a short time after a comparatively small error signal has been connected to the input terminals 100. As a result of the negative feedback, however, the stable operating condition into which the amplifier 103 has moved and which gives maximum output, is counteracted and eventually, due to the ever increasing negative feedback voltage, the whole system reverts with a step change of current to the opposite condition where the amplifier passes no output current. The output terminals of the amplifier will therefore be switched only either on or off, thus giving zero or maximum output. The frequency of these oscillations depends on the RC values of the negative feedback circuit elements 105 and 107. The resistor 110 must be smaller than the ratio of the variation of the output voltage of the amplifier to the variation of the input current to obtain the on/off switching effect which has been described. The D.C. electronic amplifier 103 is used to achieve a time-modulated mode of control. The amplifier therefore has a low time delay and normally operates in a stable manner. The application of a hypercritical positive feedback of low time delay and a sluggish negative feedback causes the output of the amplifier to alternate between a minimum and maximum value, the proportion of the period occupied by the maximum or minimum value being proportional to the input signal.

In this controller the ratio of the time during which the output terminals are switched on to the time during which they are switched off will be a variable dependent on the value of the input signal and due to the capacitor 105 a component which is the derivative of the input error signal will be introduced which causes a temporary lengthening of the switch-on time after an increase of the input signal and a shortening of the switch-on time after a reduction. The capacitor 108 when used in the circuit will cause the switch-on time to increase or decrease continuously as long as an error signal exists. The switch 104, which can be either a semiconducting device or an electromechanical relay, is used to connect a supply source 111 to the heater winding 112 of an electrothermal actuator 113. The piston 114 of the actuator 113 will then move out of the actuator more or less according to the input supplied to the heater winding 112. A semiconducting device 115 is provided to avoid overheating the actuator when it is permanently switched on. This is achieved by the semiconductor 115 having a positive temperature coefficient which changes very rapidly at a point chosen below the danger level. An increase of temperature beyond this point sharply reduces the current flowing in the heater winding 112.

The value of the components in the negative feedback circuit are selected in such a way as to operate with an extremely small proportional band that has no relation to the transfer function of the plant, the condition of which is changed by a change in the position of a valve 116. This small proportional band is chosen in such a way that the length of the onpulses entering the thermal actuator is changed with a comparatively small change of the measured value that is, for which a small change of the input value the actuator is either switched on or switched off completely. In other words, the characteristics of the controller are selected according to the transfer function of the electrothermal actuator so as to obtain a fast response.

The electrothermal actuator operates a third feedback circuit which is fed from a D.C. supply 117 and adjusted by means of operating a potentiometer 118. A circuit consisting of a capacitor 119 and a resistor 120 provides a feedback is a derivative of proportional control effect and a capacitor 121 and a resistor 122 provides a feedback which is the integral the control effect produced by the actuator. This third feedback circuit, which in combination provides the feedback group 101, is selected according to the transfer function of the plant and the combined effect of the three circuits is to obtain a control effect that, in spite of the long delay action which is inherent in an electrothermal actuator, operates with the same speed as an ordinary motor used for similar purposes.

The operation of the controller is as follows: It is assumed that the control point and the set point are identical. It is further assumed that the main loop should operate with a proportional band of 5° C. and that the proportional band of the negative feedback of the time modulated elements of the amplifier 103 is 0.1° C. It is further assumed that the valve actuator 113 is half open and that this is achieved by a heat input that will be 50 percent of the maximum continuous heating effect when the switch 104 is continuously switched on. In other words, a switching cycle of 50 percent on the 50 percent off is maintained under these conditions. If an error of 0.03° C. occurs then the output current is increased to 75 percent of the full output. This causes a quick operation of the piston 114, and movement of the slider of the potentiometer 118 will produce a proportional signal that will immediately counterbalance the error and the actuator will take up a new stable position. If the error is in the other direction, i.e., if the supply to the actuator is reduced, the same effect will occur, but particularly if the actuator is operated at a high temperature, cooling will become effective quickly and not more slowly than the heating effect.

It has been proved by experience that it is not possible to control an actuator effectively by leaving out the feedback circuit 105/110 and controlling the actuator entirely from the movement of the slider of the potentiometer 118. If this is done, a continuous oscillation of the actuator is introduced which, due to the thermal lag of the actuator, can be quite considerable. Moreover the frequency of the oscillations is not constant and this type of control can leave the actuator on or off for a considerable time creating an instability of the circuit which is not permissible even in heating installations with a comparatively large capacity.

Figure 2:
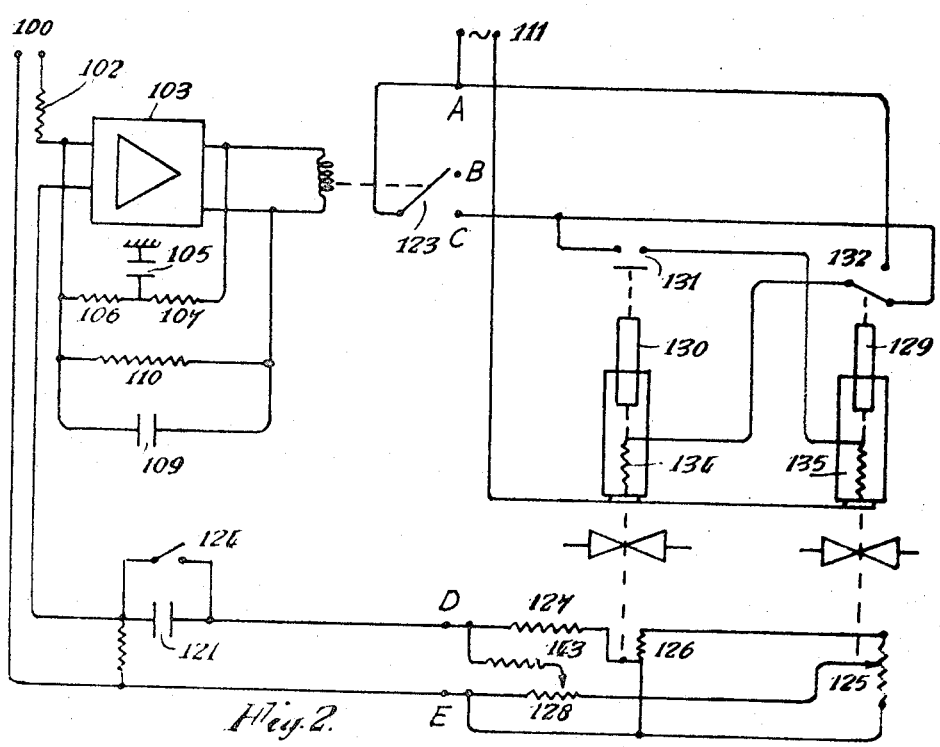
FIG. 2 is a circuit diagram of an electronic controller arranged to operate with two actuators.

FIG. 2 shows how a similar controller is used for the sequential operation of two actuators 129 and 130. Here the only difference between the circuits as compared with FIG. 1 is that the capacitor 108 has been omitted.

The derivative effect of the negative feedback has proved to be particularly suitable to this type of actuator and the integral effect is not always of great importance. The switch 104 of FIG. 1 is shown here as an electromechanical switch 123. The capacitor 121 of the third feedback circuit can be short circuited by a manually operated switched 124 because in heating installations it is often useful to introduce a proportional band which will save fuel. Otherwise the circuit is similar in principle to that of FIG. 1, except that two potentiometers 125 and 126 are now each providing a feedback voltage, these two voltages being added by means of the resistors 127, 128 and 143. The resistor 128 is a potentiometer, the slider of which is connected through the resistor 143 to the output end of the resistor 127. The feedback effect of the actuator 129 which operates the slider of the potentiometer 125 can be reduced by changing the position of the slider of the potentiometer 128.

The controller shown in FIG. 2 is used to control a heating installation operating two heating valves which become operative one after the other. The actuator 130 operates stage number one and it is normally closed when it receives no supply of electrical energy. The actuator 129 operates heating stage number two and again the actuator is of the normally closed type. An auxiliary switch 131 closes when the actuator reaches the fully open position and an auxiliary switch 132 changes over when the actuator starts to open. The feedback voltages produced by the two actuators come into operation smoothly one after another each according to its own proportional band. The proportional band of the actuator 129 is adjusted in the main controller and the proportional band of actuator 130 will be a part of it according to the position of the slider of the potentiometer 128.

The switch 123 operates in such a manner that terminals A and C are connected for longer periods when the input error signal to the control system requires more heat input into the system, and terminals A and B are connected for longer periods if less heat input is required. The actuator 129 is shown in the closed position and the actuator 130 in a partially open position. The operating sequence between the two stages is as follows: As the system requires more heat input, the switch 123 will provide a supply via terminal C and via changeover contact 132 in the position shown to energize the heating element 134 of the actuator 130. This will cause the actuator 130 to open further. The controller will continue in the same mode of operation described previously. As the system requires further heat input, the actuator 130 will continue to open until it reaches the fully open position. When this position is reached the auxiliary contact 131 will move from the position shown into the closed position. If the controller is now calling for further heat input, a supply will immediately be fed from contact C via the contact 131 to the heating element 135 of the actuator 129. This will cause the actuator 129 to start opening.

It should be noted that during the opening of actuator 130 its associated feedback potentiometer 126 has progressively increased the amount of feedback via the main feedback circuit, so that the potentiometer 126 is now producing the maximum contribution to the main feedback. The feedback potentiometer 125 will now start to make its own further contribution via the third feedback circuit as the actuator 129 opens. When the actuator 129 operates auxiliary contact 132 changes over from the position shown so as to provide a permanent feed direct from the live line of the supply 111 to the heater 134, thus keeping the actuator 130 fully open at any time during which the actuator 129 is in an open position. If the demand for heat from the controller now increases the actuator 129 will continue opening until it reaches its fully open position. If the controller now requires a reduction of heat input the switch 123 will move for longer periods to contact B thus cutting off the supply from contact C for longer periods and a reversal of the sequence described above will take place with the controller always operating in the manner described previously. When the actuator 129 reaches a fully closed position auxiliary contact 132 will change back to the position shown thus cutting off the supply from the heating element 134. If reduction in heat input is still required actuator 130 will immediately start to cool down and therefore to close. This will immediately open the auxiliary contact 131 thus cutting off the possibility of any further supply being fed to the heating element 135, so that the actuator 129 will now remain permanently closed as long as the actuator 130 is not fully open.

It will be appreciated that the control action can take place anywhere within either stage of operation here described and the progressive increase or reduction of feedback will ensure stable control in whatever position is required by the loading of the system. Thus the use of two stages instead of one in no way affects the action of the controller as previously described.

Figure 3:
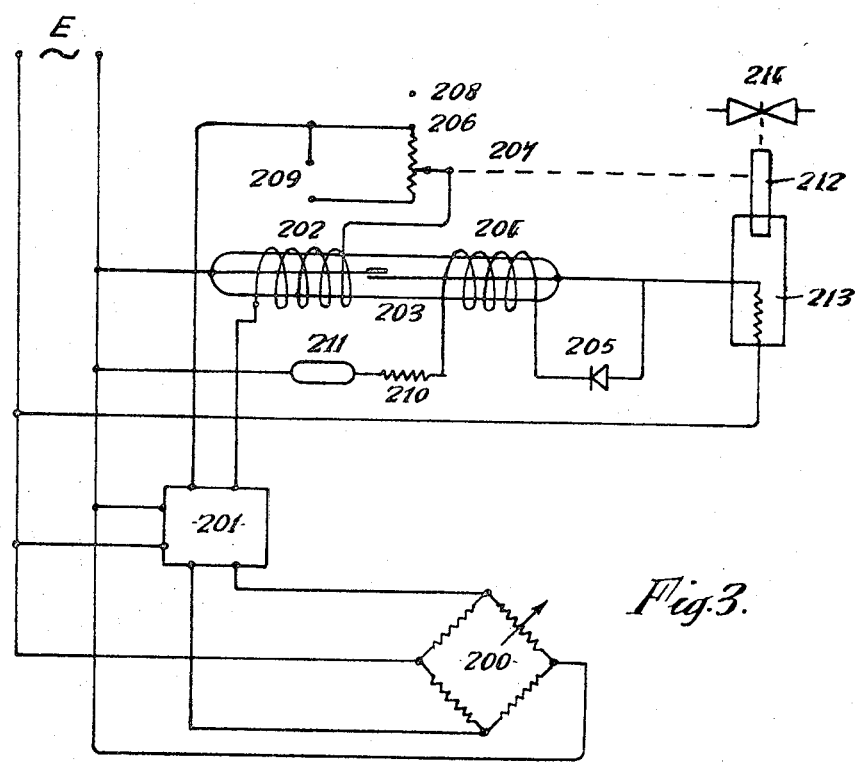
FIG. 3 is a circuit diagram of an alternative form of electronic controller.

FIG. 3 shows a controller that has great advantages due to its inherent simplicity. A Wheatstone bridge 200 provides an error signal to the amplifier 201, but it should be noted that instead of the Wheatstone bridge any other error signal input can be used and that the physical value to be detected need not be the temperature, but it might be any other physical value, for instance, humidity or the position of another valve. The amplifier 201, however, works in an entirely different way from the amplifier 103 previously described because what it does is to transform an AC input signal into a continuous DC output signal which includes a proportional, proportional/integral or proportinnal/integral/derivative component. A number of such devices are known and the Wheatstone bridge 200 might obviously be supplied with DC instead of AC It has been mentioned in connection with FIG. 1 that the controller described contains one loop operating on a very narrow proportional zone. This is achieved in the present embodiment by a winding 202 which is arranged on a reed relay tube 203. This reed relay tube is fitted with a second winding 204, both windings 202 and 204 being operated by DC current. A rectifier 205 is used to feed the winding 204 from an AC supply, but the output of the amplifier 201 is inherently DC In series with the winding 202 is a potentiometer 206 having a slider 207 and a switch-off contact 208. The potentiometer 206 is supplied from a source of DC supply 209. Another lead connects the second winding 204 to a series resistor 210 and a delay device 211. If the delay device 211 is connected to a suitable voltage the current therethrough initially is very low, but increases with heat permitting a much larger current to pass in time.

The controller shown in FIG. 3 operates as follows: If the bridge 200 is not balanced and the temperature is, say, below the set point it will produce an output current which, for example, will be a proportional function of the error. A current will flow through the winding 202 which will be energized and will close the contact of reed relay 203 thus supplying the heating element of an actuator 213 with current from the main supply so that the actuator will open a valve 214. At the same time the closure of the contact of reed relay 203 will supply the current to the winding 204 via the rectifier 205, through the resistor 210 and the delay device 211. The winding 204 thus energized counteracts the effect of the winding 202. This will produce a steady oscillation of the reed relay 203 and according to the characteristics of the reed relay and the other components that have been chosen with a cycling time of a frequency that will be high enough so as to have a steady effect on the actuator 213, the controller will provide a smooth time modulated output effect. As the piston 212 is operated, slider 207 of the potentiometer 206 will move to provide a negative feedback to the amplifier 201. According to the error signal the ratio between switch-on time and switch-off time of the current through the heater of actuator 213 will be altered.

As has been described before, the proportional band of this time-modulating control feature is adjusted to that of the actuator in such a way as to switch the actuator on and off with an extremely small proportional band ensuring considerable speed of movement. On the other hand, the DC voltage 209 supplied to the potentiometer 206 has to be adjusted in such a way that it represents the feedback that is characteristic for the proportional band of the plant, the condition of which is changed by the value 214. Obviously, the amplifier 201 can produce a proportional signal, a proportional/integral signal, or a proportional/integral/derivative signal, and it is therefore possible to provide the best possible control effect on the actuator according to the requirements. This arrangement is particularly simple when multistage control is used. It avoids the use of capacitors to produce a reasonably stable oscillation frequency and the amplifier becomes very simple. Another extremely effective method to limit the movement of the actuators is to insert a device the resistance of which increases rapidly when a certain temperature is reached in series with winding 202.

Finally in connection with this controller, the potentiometer 206 has a contact 208 which interrupts the feedback and switches the actuator when it has reached its maximum position. This is an alternative to limiting the current supplied to the actuator and is innocuous for it causes only a cycling small valve movement in the fully open position. In the case of the operation of a damper this can, of course, be avoided by discontinuing the mechanical connection between the damper and actuator at a certain maximum position. Instead of the feedback circuit 206/209, the piston 212 of the actuator can change the balance of the bridge 200 or a resistor of the bridge can be made dependent on the temperature of the actuator 213.

Figure 4:
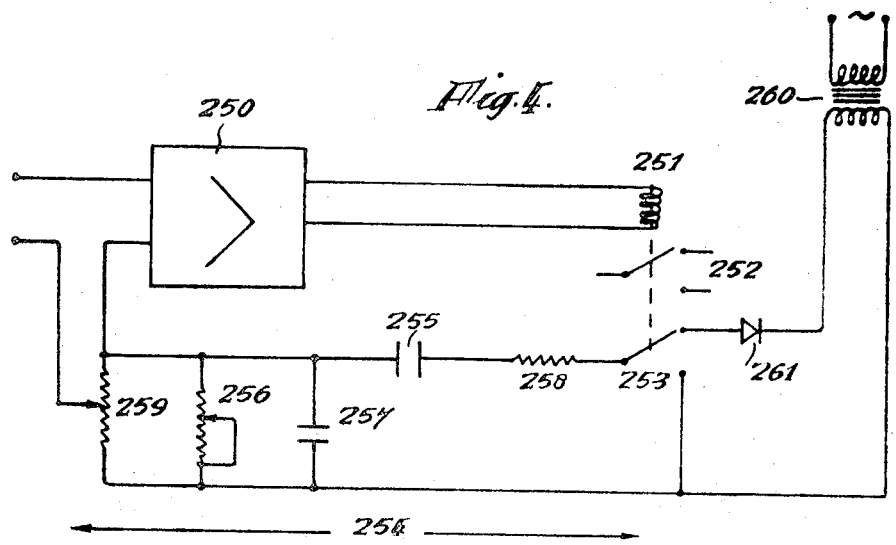
FIG. 4 is a modified circuit diagram of part of the controller shown in FIG. 1.

FIG. 4 shows a modified form of the controller shown in FIG. 1. The amplifier 103 together with its first and second feedback systems 102—111 respectively may be replaced by the circuit arrangement shown in FIG. 4, while still maintaining a satisfactory overall control which is similar to that obtained with the circuit of FIG. 1. The arrangement includes an amplifier 250, the output of which is connected to a winding 251 of a relay having a pair of contacts 252 and 253. The contact 252 perform the same function as the switch 104 in FIG. 1. The contact 253 supplies a feedback circuit 254 with rectified DC obtained from a suitable source of AC supply and passed through a transformer 260 and rectifier 261. The feedback circuit includes a series capacitor 255, a series resistor 258, a parallel variable resistor 256 and a parallel capacitor 257. The end of this feedback network is shunted by a potentiometer 259, the slider of which is connected to one of the input terminals of the controller. The capacitor 257 and the resistor 258 in combination with the action of the contact 253, will cause the controller to produce a time-modulated proportional output. The capacitor 255 and the variable resistor 256 will cause the controller to produce a component which is proportional to the integral of the input signal.

When the contacts 253 switch the current into the circuit, the capacitor 257 increases its charge and builds up the voltage across the resistor 256 which will switch the output relay 251 through the amplifier 250 so that the contacts 253 are made and the capacitor 257 is gradually discharged. This cycle of events continues giving the same duration of on-and-off time if the capacitor 255 has a charge equivalent to half the voltage from the rectifier 261. Should an error signal develop across the resistor 256, an additional bias is added to the circuit causing the contacts to be open or closed for a longer duration and the charge on the capacitor 255 will slowly integrate away, canceling any offset. If the capacitor 255 and the resistor 256 are left out in this circuit, it will not work as a proportional/integral controller, but as a proportional controller and the energy supplied to the actuator 113 in FIG. 1 will be proportional to the error signal caused by a deviation of the controlled magnitude.

As has been described in the three previous control systems, at least two superimposed feedback circuits must be utilized if a high speed of movement is required, the first of which has an on/off circuit in which the ratio of on time to off time is altered with the error signal, and a small proportional band is laid out according to the characteristics of the actuator and not of the plant. The second feedback which is a function of the actuator position is then laid out according to the transfer function of the plant. There are however applications when the described actuators are used in a plant which can be operated very slowly like in space heating. In that case any type of time-modulating controller like that shown in FIG. 4, or a bimetal thermostat with accelerator can be used successfully, but the proportional band of the time-modulated controller must then be chosen according to the characteristics of the plant.

Figure 5:
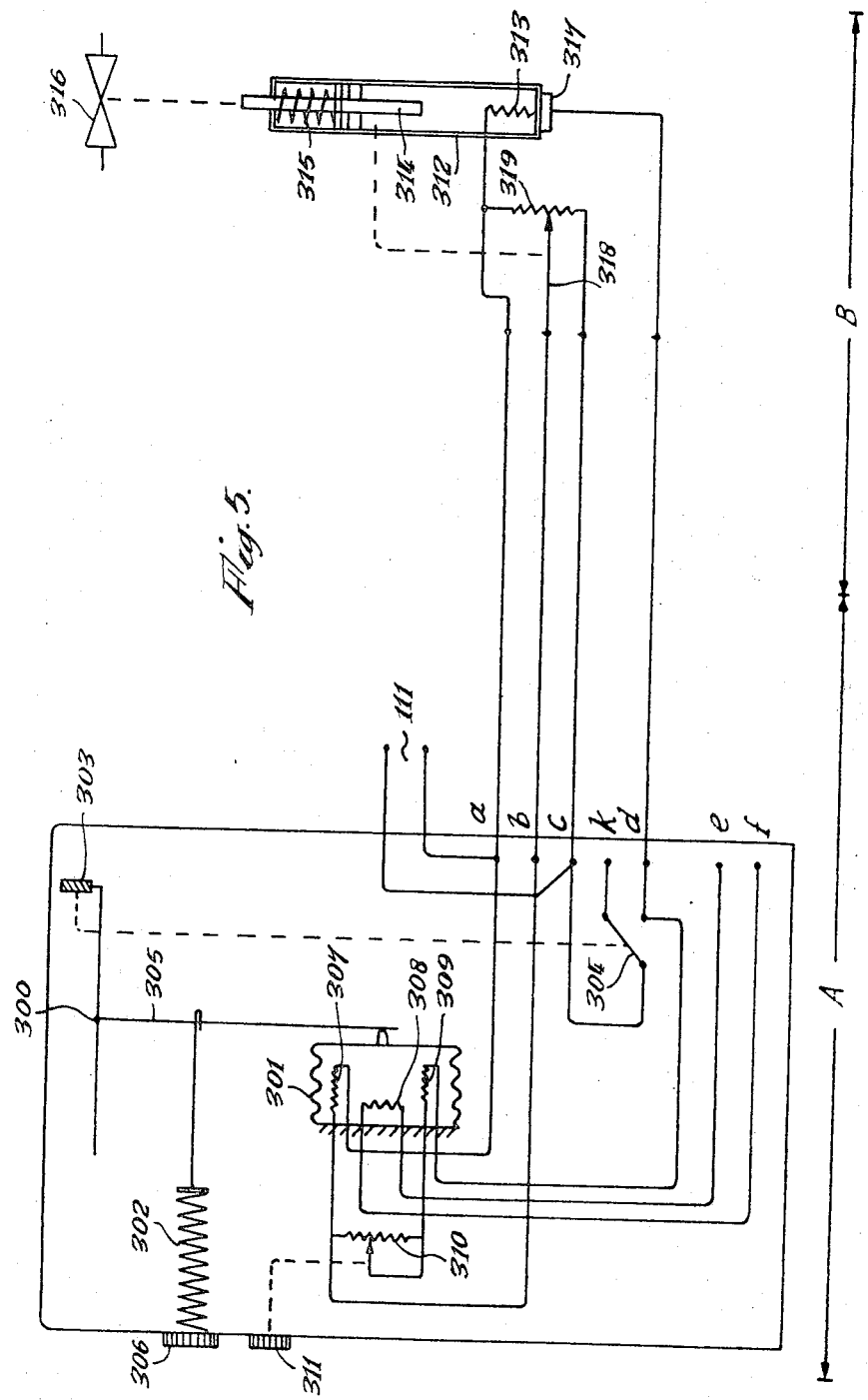
FIG. 5 is a diagram of one form of mechanical controller.

Referring now to FIG. 5 which shows a controller actuated by vapor pressure expansion, part A is the controller and part B is the actuator. The controller consists of a lever system moving around an axis 300 which is in mechanical connection with bellows 301, a spring 302 and switch 303, the contacts 304 of which operate as a changeover contact. While the contact is connected to the horizontal part of the lever, the vertical part of the lever 305 is influenced by the spring 302, the setting of which can be changed by means of a knob 306. The bellows 301 which is fixed at its left-hand edge in the FIG. is influenced by three heater elements 307, 308 and 309 each of which is capable of injecting a small amount of electrically produced heat which, as will be seen, is sufficient to cause the necessary effects. A resistor 310 can be adjusted by means of a knob 311. Terminals a to f are provided for connecting various leads. Terminals e and f are in reserve and in the present controller the heater element 308 is not used. The actuator of such a system is shown in part B. The cylinder 312 contains a medium for instance wax, which expands under the influence of heat produced by heating an element 313 and pushes the piston 314 out against the force of the spring 315 operating a valve 316. A heat-limiting device 317 for instance a temperature coefficient thermistor will prevent overheating in case the operator is working in a room with an ambient temperature that is very high and the control current is left permanently switched on. The piston 314 operates the slider 318 of a potentiometer 319 and in this way provides a feedback effect.

The operation of the controller shown in FIG. 5 is as follows: The bellows 301 are exposed to the temperature of the space which is to be controlled and are filled with a gas or vapor so that a rise in space temperature will cause the bellows to expand and a fall in temperature will cause the bellows to contact. Under the influence, for example, of a falling temperature the bellows will contract and the switch 303 will be operated so that contact 304 will take up its lower position connecting a live supply from the terminal c to the terminal d and thence through heat-limiting device 317, to the heating element 313 and back to the neutral terminal a. At the same time the supply will be fed to the heater element 309 which will start heating up the vapor inside the bellows 301. Heater element 309 requires only very little power. This will in turn expand the bellows and move the contact 304 of switch 303 back into the position in which it is shown. As soon as the heater element 309 is disconnected the bellows 301 will start to cool down and contact 304 of the switch 303 will return to the lower position connecting terminals c and d as before. The switch 303 can be made very sensitive and in a practical application it may also be constructed so as to operate contact 304 indirectly by using a reed relay arrangement. This design feature can be of considerable importance because the frequency of oscillation of the contact 304 should be kept fairly high, for example, between 20 seconds and 2 minutes and, particularly in a private house, the radio interference of such frequent switching can have a most undesirable effect, if the current switched is of significant proportions.

Apart from the effects described, the feedback slider 318 moving along the potentiometer 319 will change the heat input to the feedback heater element 307 which is thus energized continuously, according to the position of the actuator. In this way the effect previously achieved electronically can be obtained by mechanical means, which in mass production are substantially cheaper than electronic designs. The bellows 301 can be designed so as to respond to minute changes of temperature and in view of the fact that the internal heaters only have to heat up the vapor inside the bellows, and on the other hand the vapor loses its heat content very quickly through the walls of the bellows 301, a satisfactory cycling and feedback effect is achieved.

Under these circumstances the potentiometer 319 can be of extremely small dimensions and the proportional zone of the bellows system can be kept very narrow so as to give the system a high sensitivity. As usual, the proportional band adjusted on potentiometer 310 must be kept fairly wide when the controller is used in a space and the heat carrier is not controlled in such a way as to make the described device a cascade controller. If the proportional band is made too small the control loop becomes unstable. The bellows 301 in combination with its time-modulated feedback can be designed with an extremely small proportional band down to small parts of a °C.

In the above example the heater 313 is located inside the body of the actuator. This construction is only one example since there are several other possibilities. For example, the heating element may be wound on the outside of the case containing the expanding material.

It should be mentioned that although the preferred solution to the mechanical controller is shown in FIG. 5 to use bellows as temperature-sensitive elements for either measurement or control purposes, or both, practical experience has shown that it may be possible to use some form of bi-or polymetal arrangement which produces movement on change of temperature instead of the bellows system depicted.

Figures 6, 7A, 7B, 7C:
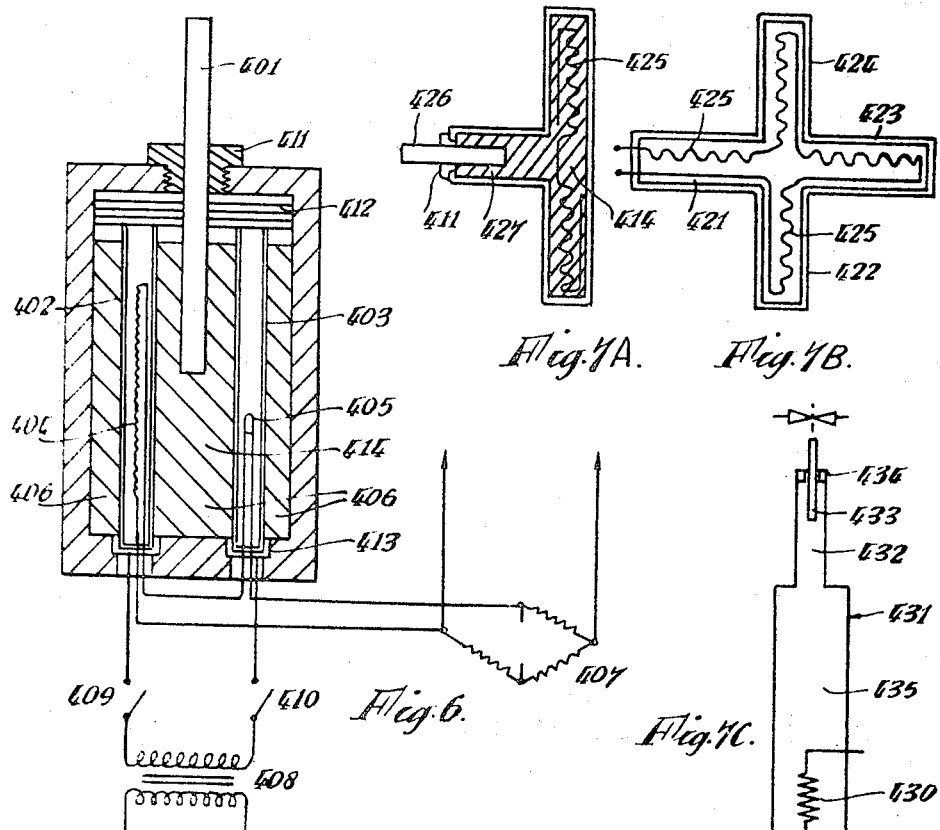
FIG. 6 shows one preferred form of mechanical controller.
FIGS. 7A and 7B show an alternative form of actuator.
FIG. 7C shows yet a further alternative form of actuator.

A very different design of actuator is shown in FIG. 6 where the expanding material, for instance wax, contains an additive which allows the conduction of electricity so that no separate heating element is needed. Such an additive might, for instance, be some form of carbon or possibly a metallic dust. The outside case 400 contains the conducting expanding material 406 which acts on the piston 401. In the material 406 are inserted two strong metal tubes 402 and 403, which are kept in position by means containing insulating discs 412 and 413, the former providing a heat insulation between a heating area 414 and a gland 411. The gland 411 is cooled by the outside air and operates as a guide for the piston 401. The area 414 thus constitutes a localized area whereby a sufficient temperature difference is maintained between it and the gland 411. The tube 402 contains an insulated resistance thermometer winding 404 which provides an alternative method of providing a feedback to the various types of controllers via a bridge 407 which could also be used in other designs of actuator. The tube 403 contains a current-limiting device 405 of a type similar to that mentioned in the previous FIG. The leads from contacts 409 and 410 are shown wired to tubes 402 and 403 which also act as current-carrying electrodes. Contacts 409 and 410 are shown as part of a double-pole switch, but a single-pole version may be sufficient. A transformer 408 is shown with an earth-center tapping. Using the normal nonconducting expanding material, as any type of wax, a different version of this design might use the tubes 402 and 403 to contain insulated heating elements with either the same or a conventional feedback arrangement.

FIGS. 7A and 7B show two views, in third-angle projection, of an actuator made in the form of a cross so that a greater amount of heating element may be used for an actuator required to have a very rapid response and needing a very rapid warmup. Naturally, other shapes could be used, for instance by leaving out three parts of a cross resulting in the piston axis being at right angles to a single heating cylinder.

In FIGS. 7A and 7B, the actuator which has a cross-shaped cross section has in effect four arms 421, 422, 423 and 424. The heater winding 425 is in four series connected sections one in each arm of the actuator. The piston 426 is housed in the upper part 427 of the actuator. It will be appreciated that due to the positioning of the heater winding 425 in the four separate arms of the actuator a good thermal and electrical insulation is obtained between the winding 425 and the piston 426.

One special advantage of the actuators described above is that the expanding material which operates the piston is such that in some embodiments no special seal need necessarily be used at the point where the piston extends from the body of the actuator, beyond a normal plain sleeve bearing because of the self-sealing properties of the expanding material.

A method of construction which may be used to ensure that the temperature at the piston end of the actuator is kept low is shown in FIG. 7C. It will be noted that the heating element 430 of the actuator 431 is located at the lower end thereof and the upper portion of the actuator is constructed so as to provide a neck 432 in which the piston 433 is located. A gland 434 is cooled by the outside air and operates as a guide for the piston 433. This will ensure that the material will retain its self-sealing properties under all temperature conditions likely to be experienced in operation. A space 435 between the heating element 430 and the gland 434 acts as said localized area.

The wax which is used as a medium in the casing of the actuator and which expands and becomes liquid on being heated is a polyethylene wax. Polyethylene waxes exist that start to expand at or above 85° C. and can be heated to a maximum temperature of between 130° C. and 200° C. Moreover due to its good heat-insulating properties it can be liquefied locally in the region of the heaters whilst remaining solid in the region of the gland where the piston passes through the casing of the actuator. A particularly suitable wax is a polyethylene wax which begins to expand at about 90° C., has achieved most of its expansion at about 150° C. when it is liquid and will tolerate indefinitely a temperature of about 170° C.

Figure 8:
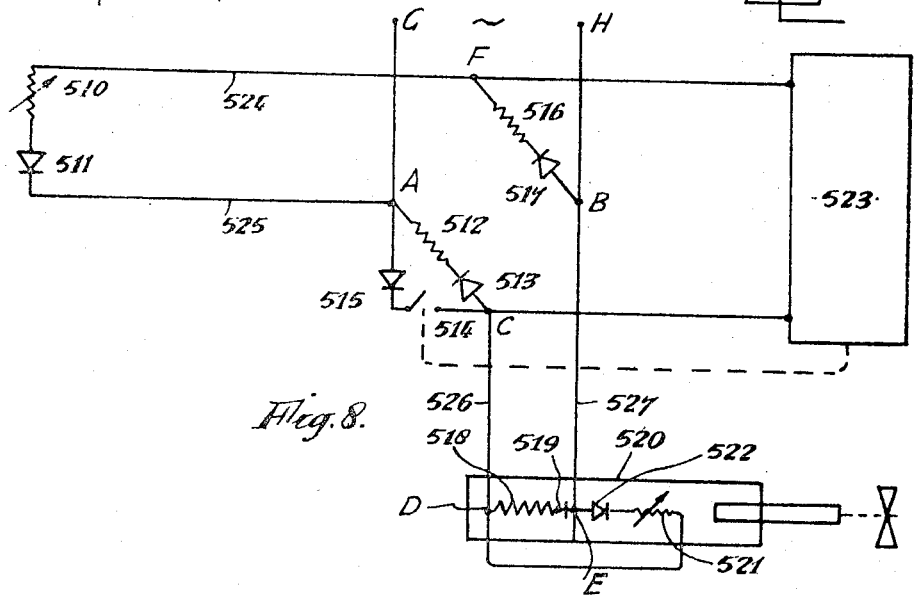
FIG. 8 is a circuit diagram of a simplified wiring between controller and actuator.

FIG. 8 shows an entirely different method of control which is especially useful because it provides for a method of wiring between measuring element, controller and actuator which is far simpler than any used hitherto. In fact, only two wires are required between the measuring element and the controller and only two wires are required between the controller and the actuator. FIG. 8 shows a resistance thermometer 510 which is in series with a rectifier 511. These form parts of a Wheatstone bridge which is bounded by the four terminal corners A, B, C and F. As can be seen, the other arms of the bridge consist of a fixed resistance 512 and a rectifier 513, in parallel with a contact 514 and rectifier 515, all between the terminals A and C, and a fixed resistance 516 and a rectifier 517 between the terminals F and B. The other arm of the bridge between the terminals B and C is completed by a heating element 518 and a rectifier 519. These are located between terminals D and E on the actuator itself. In parallel with the terminals D and E on the actuator 520 is a resistance thermometer 521 and a rectifier 522. The resistance thermometer 521 measures the temperature of the expanding material and its location may or may not be within the material itself according to application and design considerations. The terminals A and B of the bridge are supplied with AC from terminals G and H. The terminals C and F are connected to the input of an amplifier 523 of the controller.

The operation of the system is as follows: the Wheatstone bridge system described provides for both a normal Wheatstone bridge containing the resistance thermometer 510 which measures the temperature to be controlled and, in the opposite arm, the resistance thermometer 521 which provides the feedback, so that the resultant signal is fed from terminals C and F to amplifier 523 of the controller. It will be observed, however, that the operation of this part of the Wheatstone bridge arrangement can take place using only one-half of the cycle of the normal A.C. supply from the terminals G and H because of the incorporation of rectifiers 511, 513, 517 and 522. These ensure that current in the one-half cycle from the terminal H can flow via the terminal B through the rectifier 517 and the resistance 516 to the terminal F, then through the resistance thermometer 510 and the rectifier 511 back to the terminal A, thence out to the other conductor via the terminal G and also from the terminal H via the terminals B and E, through the rectifier 522 and the resistance thermometer 521 back via the terminals D and C through the rectifier 513 and the resistance 512 via the terminal A and back to the second conductor at the terminal G. The two paths just described will provide for the normal operation of this measuring bridge, but as mentioned, it will use only one-half cycle of the AC supply and it will therefore be obvious that the resistance thermometers will be active for only half the total operating time. Current from the terminal H will not be able to flow through the rectifier 519 and the heater element 518 and during the other half cycle no current can flow between terminals A and C or F because of the presence of the rectifiers 511 and 513 when the contact 514 is open. The energization of the heater 518 from amplifier controller 523 takes place by utilizing the other half cycle of the AC supply between terminals G and H in that the supply in the other half cycle from terminal G cannot take the path from terminal A which leads either to terminal C or back to terminal F via resistance thermometer 510 because of the presence of the rectifiers 511 and 513. It can, however, take the path from terminal C via rectifier 515 and contact 514 when closed. Contact 514 is operated by the output of amplifier 523 in a time-modulating manner which has been described with reference to FIG. 4. The contact 514 can therefore pass the signal on via the terminal C to the terminal D to the heating element 518 and thence via the rectifier 519 and the terminal E back to the terminals B and H to the second conductor of the AC supply.

It will be noted that the current from the terminal D cannot pass through the parallel arm containing the resistance thermometer 521 because of the presence of the rectifier 522. This method just described of using the two opposite half cycles of a normal AC supply to fed both the input bridge arrangement and also the output from the same amplifier makes it possible to use only two current conductors, namely conductors 524 and 525 between measuring element and controller, and conductors 526 and 527 between the controller and actuator. The remainder of the bridge between the four terminals A, B C and F can obviously be constructed in practice as part of controller. This scheme, providing for this very simple wiring arrangement is particularly valuable in a wide variety of applications where the standard of labor used to perform electrical wiring and connection work is of a low order. Naturally, many other applications outside these involving the measurement of pure temperature may be possible using a similar scheme where a change in the electrical resistance can be employed to measure the controlled variable.

In the system described above, close attention must be paid to the values of the resistances which are used. It may also be noted that balance may be achieved in two adjacent arms instead of those opposite by using resistance thermometers with opposite "positive" and "negative" coefficients.

Figure 9A:
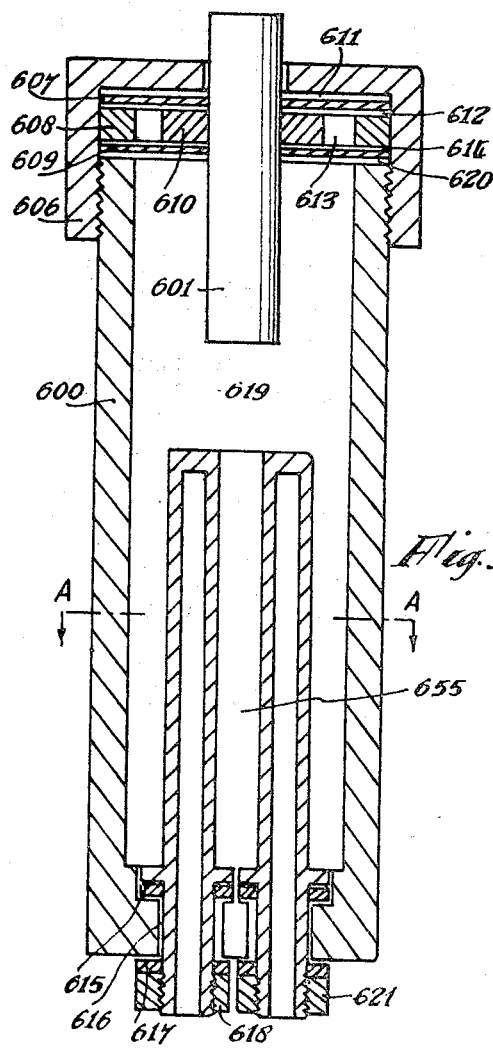
FIGS. 9A and 9B show a fourth type of actuator.
Figure 9B:
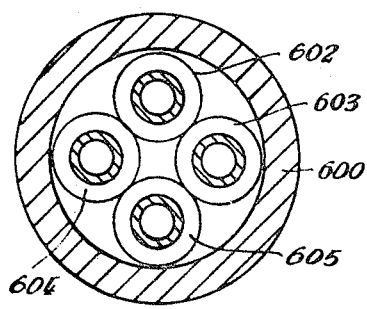

The operation of the thermal actuator shown in FIGS. 9A and 9B is based on the principle that the expanding material 619 will force out the piston 601 when heat is supplied according to the dictates of an externally connected controller. If heat ceases to be supplied then the material 619 will contract and the piston 601 will, under the influence of a spring, be retracted. In an actuator of this type a number of special design features are extremely important in order to ensure efficient operation. A major problem is that of efficient heat transference from the heating element to the expanding material. In the design shown, hollow tubes 602, 603, 604 and 605 are inserted in the main body 600 of the actuator leaving a central space 655 constituting said localized area. The hollow bodies of these tubes contain heating elements which can be of various types, such as resistance wire, carbon etc. The connection from the outside of the tube can be made through some form of seal at the end of the tubes. This design, using internal heating for the expanding material in the actuator, ensures an immediate heat transfer to the material 619 and therefore very rapid response is achieved. The present design shows the heating tubes arranged vertically along the length of the actuator body. It may be possible to provide heating tubes which are positioned horizontally across the width of the actuator body. As has been mentioned it is also possible to construct a heating arrangement wherein the heating element is attached or wound onto the outside of the actuator body.

It is very important to prevent heat transfer between either the heating element or the main body of the actuator and the piston 601 which will be externally connected to an operator such as a valve. A further problem is concerned with ensuring effective sealing at any gland or bearing containing piston 601 so that the expanding material 619 is prevented from leaking. Clearly, the design must cater for the solution of both the last two named problems at the same time.

To achieve this, the upper body of the actuator is terminated by a sealing cap 606 which allows the piston 601 to pass through its center and does not come into contact with piston 601 directly. The drawing shows a gap between the piston and the body of the cap 606. Screwed down inside the cap are already a number of sealing rings which will effectively prevent escape of the expanding material 619. These rings may be arranged in various ways, one example of which is shown in FIG. 9A. Metal rings 607, 608 and 609 are provided to give mechanical strength to the arrangement. Rings of insulating material 611, 612, 613, 614 and 620 are provided between the various rings and have a certain degree of compressability. The arrangement also includes a central bearing ring 610, which can be of the self-lubricating type. It will be noted that the sectioned rings of insulating material are arranged so that no heat transfer can take place between the main body 600 or cap 606 of the actuator and the bearing 610 or the piston 601. An important feature of this design is to ensure that whatever arrangement of sealing rings or other sealing methods are used, such heat transference should be prevented, otherwise the actuator may cease to operate efficiently. This feature is of particular importance if an external method of heating is used. In order to prevent too much heat being transferred from the heating elements via the tubes 602, 603, 604 and 605 containing them, the two tubes shown in the elevation have insulating washers 615 and 617 together with a core 616 arranged so as to prevent heat transference between the tubes of the main body 600. The tubes are simply fixed by means of nuts 618 and 621. Temperature-detecting devices used to limit the maximum temperature attained by the heating tubes can be clamped between the insulating washers 617 and nuts 618 where the temperature can be measured accurately. It may be possible in a different design to thread a longer section of the heating tubes and also the main body of the actuator so that the tubes are screwed directly into the main body.

Although FIGS. 9A and 9B show hollow tubes intended to contain internal heaters as described it may be possible to use a similar arrangement with one or more of the tubes acting directly as electrodes. One of the tubes may also contain inside either a current limiting device or some other temperature measuring element such as a resistance thermometer.

Figure 10:
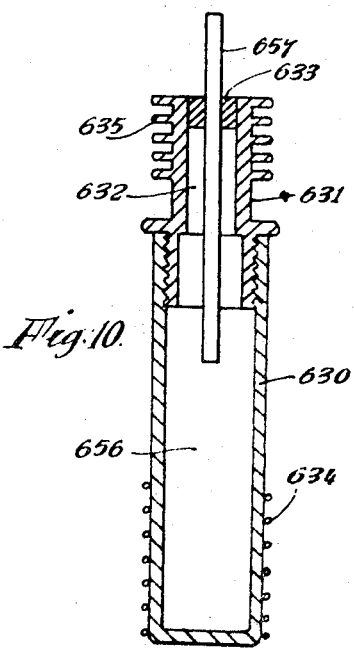
FIG. 10 shows a fifth type of actuator.

FIG. 10 shows an actuator designed in accordance with the principle shown in FIG. 7C in somewhat greater detail. Only the upper part of the actuator case has been shaded for clarity. The main body of the actuator consists of two parts 630 and 631 which are screwed together as shown. Both parts contain the expanding material for example wax, used in all these actuators, but it will be noted the internal cross-sectional area in the region 632 is considerably smaller than that in the lower portion of the actuator 630. This utilizes the principle disclosed in FIG. 7C. Cooling fins 635 shown as part of the upper section 631 will assist in keeping the area near a gland 633 through which the piston 657 operates as cool as possible so that the expanding material which will have a measure of solid consistency in this area, will be prevented from escaping. The coils 634 of a heater element are wound around the lower part of section 630 so that most of the lower portion 656 of wax within the actuator 630 constitutes said localized area. This method of external heating has already been referred to previously. However, it should be noted that it is possible to arrange the design shown in such a way as to use the sealing arrangement at the sealing end of the actuator similar to that depicted in FIGS. 9A and 9B. It is also possible to use designs such as are shown in FIGS. 9 and 10 with a form of internal heating provided by an electrode inserted in the lower end of the actuator which passes current through a conducting form of the expanding material, the current being collected either by a second electrode or by a terminal on the actual case of the actuator and the case acting as the collecting electrode.

Figure 11:
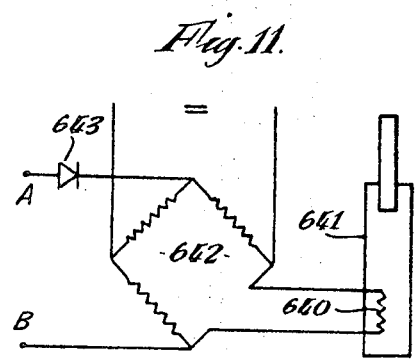
FIG. 11 shows a modified input circuit to an actuator.
Figure 12:
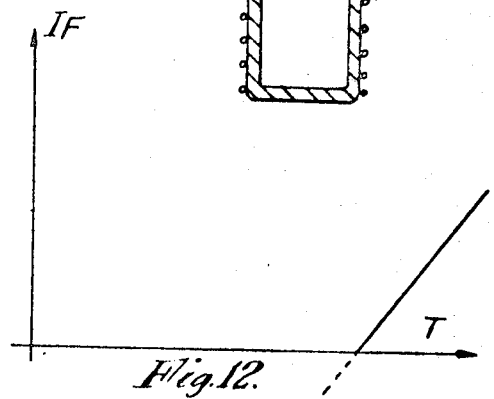
FIG. 12 is a graph illustrating the principle of the actuator input shown in FIG. 11.

FIG. 11 shows a method of limiting the temperature rise of the expanding material inside a thermal actuator which can be applied to any of the previously described controllers. The bridge arrangement 642 shown in FIG. 11 will be connected to the controller feedback circuit in such a way that the output from the bridge assists the normal feedback arrangement already present and therefore opposes the signal from the main measuring bridge in the controller. In addition to the resistance thermometer 640 which is used to limit the temperature of the expanding material, the actuator 641 will have a further resistance thermometer as part of the normal feedback bridge, which is not shown in FIG. 11. The action of the bridge 642 is as follows: The balance point of bridge 642 is arranged to occur at a temperature which will be the maximum that is normally desirable in the actuator body as measured by the resistance thermometer 640, for instance 175° C. At this balance point the normal reversal of current direction will take place. During normal operation when the temperature of the actuator will be below the value at which bridge 642 balances, the output of the bridge 642 will be in such a direction as is inhibited by a rectifier 643, so that no current will pass from a terminal B to a terminal A. If, therefore, the actuator temperature rises above the set value the output from the bridge 642 will reverse and current will flow from the terminal A to the terminal B. The effect of this operation is shown graphically in FIG. 12, where feedback current $I_f$ is plotted to a base of temperature T. The bridge 642 will be connected via the terminals A and B in such a way as to ensure that the output from the terminal B described above assists the normal feedback action and therefore opposes further control action being taken by the main part of the controller and a further rise of actuator temperature will thus be prevented.

The controller used in conjunction with any of the actuators described in the specification can as stated above operate with proportional action, integral action or derivative action or any combination of these actions. It will be appreciated that any other type of time modulator can be used to control the heat input to the actuators. For instance instead of using a controller such as that described in FIGS. 1 and 3 to effect the time-modulated action, these controllers together with their feedback circuits may be replaced by a computer which is programmed to operate in accordance with the requirements of the plant.

I claim:

1. An electrical process control system for maintaining the magnitude of a physical parameter at a desired value, including;
    a detector measuring the magnitude of said physical parameter, and having an output;
    a controller receiving at least one input signal from said detector and adapted to operate in a time-modulating mode to produce an output signal;
    two-state switch means controlled from the output of said controller;
    a thermal actuator which controls said magnitude and has a relatively slow response, said actuator comprising a container, a material disposed in said container, the volume of said material being dependent on its temperature, an electric heater operatively associated with said material, an actuating element partially disposed within said container for movement outwardly upon expansion of said material, and means of urging said actuating element inwardly toward a withdrawn position;
    an electric supply source connectable across said electric heater through said two-state switch means, said switch means being so controlled from said output of said controller as to switch on and off the electric current from said supply source to said electric heater; and
    feedback means operatively connected to said input signal which, when said actuating member is moved in a direction to cause a change in said magnitude in one sense said feedback means changes the said input signal in the sense corresponding to a change of said magnitude in the opposite sense.

2. A control system according to claim 1, wherein said feedback means includes:
    a feedback network;
    a source of current for supplying said feedback network; and a resistance thermometer connected in said network and positioned to be influenced by the temperature of said thermal actuator, the output of said feedback network being connected to the input of said controller.

3. A control system according to claim 1, wherein the container of the thermal actuator includes a tube, a resistance thermometer housed within said tube and output leads from said resistance thermometer; and wherein the feedback means includes a bridge circuit in one arm of which the output leads of the resistance thermometer are connected, whereby the resistance thermometer measures the temperature of the actuator, which temperature is a function of the position of said actuating element.

4. A control system according to claim 3, wherein said container further includes a second tube and a positive temperature coefficient thermistor housed within the second tube, said thermistor being connected in series with the resistance thermometer in said one arm of the bridge.

5. A control system according to claim 1, wherein the feedback means includes a feedback circuit having an input and an output, a potentiometer connected across a source of current and having a slider, and a mechanical link which connects the slider of the potentiometer to the actuating element of the actuator, the electrical output from the slider being connected to the input of the feedback circuit, the output of which is associated with the input to the controller.

6. A control system according to claim 5, wherein said feedback circuit includes between on the one hand the slider of the potentiometer and an input to the controller and on the other hand a common lead connecting one end of the potentiometer and the output from the detector, a resistor, a shunt capacitor, a series capacitor and a shunt resistor in that order from input to output of the feedback circuit.

7. A control system according to claim 1, wherein said controller includes an amplifier, and first and second superimposed feedback circuits for said amplifier, said first feedback circuit producing a negative feedback which is a derivative of the input signal to the controller and said second feedback circuit producing a positive feedback.

8. A control system according to claim 7, wherein said first feedback circuit includes a capacitor, whereby the output from the amplifier is a signal which is a proportional/integral/derivative of the said input signal.

9. An electrical process control system for maintaining the magnitude of a physical parameter at a desired value including a detector for producing a signal in accordance with said physical parameter; a controller receiving the signal from said detector and having an output; a differential relay having first and second windings and a two-state switch element; a thermal actuator which controls said magnitude, said actuator comprising a container, a material disposed within the container, the volume of the material being dependent on its temperature, an electric heater operatively associated with the material, an actuating element which is partially disposed within the container and which is moved outwardly upon expansion of said material, and means for urging the actuating element inwardly to its withdrawn position; a source of electric supply which is connectable across the electric heater through said two-state switch element; a potentiometer having a slider; a second source of electric supply connected across the potentiometer; a mechanical link connecting across the potentiometer; a mechanical link connecting the slider of the potentiometer to the actuating element of said actuator; the first winding of the differential relay being connected in series with part of the potentiometer through the slider thereof across the output of the controller and the second winding being connected in parallel with the electric heater across the first source of electric supply.

10. A control system according to claim 9, further including a Wheatstone bridge which is connected across said first source of electric supply, said detector forming one arm of said Wheatstone bridge and the output of the bridge being applied to the input of the controller.

11. A control system according to claim 9, wherein said differential relay comprises a reed relay tube, the first winding causing the closing of the reed elements when energized and the second winding counteracting the magnetic effect of the first winding when energized to open the reed elements, said system further including a delay element in series with the second winding.

12. An electrical process control system for maintaining the magnitude of a physical parameter at a desired value, including, a controller receiving at least one input signal from a detector measuring the physical magnitude and having an output; two-state switch means; a pair of thermal actuators which control said magnitude and which can be actuated sequentially, each actuator comprising a container, a material having a volume which is dependent on its temperature being disposed within said container, an electric heater operatively associated with the material, an actuating element which is partially disposed within the container and which is moved outwardly upon expansion of said material, and means for urging the actuating element inwardly to its withdrawn position; a source of electric supply which is connectable across the electric heaters of said containers through said switch means, said switch means being controlled from the output of the controller so as to connect and disconnect said supply source and said electric heaters in the said thermal actuators; a pair of potentiometers each having a slider; a pair of mechanical links connecting the slider of each potentiometer to the actuating element of a corresponding one of said pair of actuators; a feedback circuit for receiving the electrical outputs from the sliders of said potentiometers, said outputs from said sliders being added together in the feedback circuit; said feedback circuit being connected to the input of the controller to supply a feedback signal thereto.

13. A control system according to claim 12, wherein said switch means for supplying current to the electric heaters of said pair of actuators includes a first switch mechanically connected with the actuating element of a first one of said pair of actuators, the switch being open when the actuating element of said first actuator is withdrawn; a second switch mechanically connected with the actuating element of the second of said pair of actuators, the second switch being closed when the actuating element of the second actuator is withdrawn; said electric heaters of the actuators being connected in parallel with each other through the two-state switch means, the first switch being connected in series with the electric heater of the second actuator and the second switch being connected in series with the electric heater of the first actuator.

14. An electrical process control system for maintaining the magnitude of a physical parameter at a desired value including, a mechanically sensitive device which expands and contracts according to the magnitude of the parameter; two-state switch means; a thermal actuator which controls said magnitude and has a relatively slow response, said actuator comprising a container, a material disposed within the container, the volume of said material being dependent on its temperature, an electric heater operatively associated with the material, an actuating element which is partially disposed within the container and which is moved outwardly upon expansion of said material, and means for urging the actuating element inwardly to its withdrawn position; a source of electric supply which is connectable across the electric heater through said switch means, said switch means being controlled by the expansion and contraction of the mechanically sensitive device so as to connect and disconnect said supply source and said electric heater in the thermal actuator; and feedback means between said actuator and said mechanically sensitive device, whereby when said actuating element is moved in the direction to cause a change in said magnitude in one sense, said mechanically sensitive device is changed in a manner corresponding to a change of magnitude in the other sense.

15. A control system according to claim 14, wherein said feedback means includes a potentiometer connected across said source of electric supply and in parallel with the electric heater, said potentiometer having a slider; a mechanical link connecting the slider to the actuating element of the actuator; and an electrically operated feedback circuit associated with the mechanically sensitive device and supplied from the output of the slider, said feedback circuit, when operative, controlling the rate of expansion of the said mechanically sensitive device.

16. A control system according to claim 14, wherein said mechanically sensitive device comprises bellows filled with a gas and said physical parameter is temperature, a rise in temperature causing the bellows to expand and a fall in temperature causing the bellows to contract; a mechanical link for operating the two-state switch means in accordance with the size of the bellows; and at least one electric element within the bellows supplied from the feedback means for heating the gas contained therein to cause its expansion.

17. A control system according to claim 16, wherein said mechanical link includes lever means connected between the bellows and the two-state switch means; and spring means urging the lever means in a direction to oppose motion of the lever due to expansion of said bellows.

18. An electrical process control system for maintaining the magnitude of a physical parameter at a desired value including, a detector for producing a signal in accordance with said physical parameter; a controller having an amplifier receiving as an input the signal produced by the detector; two-state switch means controlled from the output of the amplifier; a thermal actuator which controls said magnitude, said actuator comprising a container, a material disposed within the container, the volume of said material being dependent on its temperature, an electric heater operatively associated with the material, an actuating element which is partially disposed within the container and which is moved outwardly upon expansion of said material, and means for urging the actuating element inwardly to its withdrawn position; a two-lead source of AC supply; a Wheatstone bridge having four arms and two pairs of opposite points, at least one rectifier being included in each arm, said AC supply being connected across a first pair of said opposite points of the bridge; said amplifier, being connected across the other pair of opposite points of the Wheatstone bridge, said detector, said switch means and said electric heater being connected in arms of said bridge, the arrangement being such that the electric heater is supplied during a first half cycle if said switch means is closed, the amplifier and detector being supplied during the other half cycle of the AC supply.

19. A control system according to claim 18, wherein the two arms of the Wheatstone bridge connected to a first terminal of the AC supply include a rectifier and the electric element of the detector in series, and a parallel combination of a rectifier and resistor in series and a rectifier and the two-state switch in series; and the two arms of the Wheatstone bridge connected to a second terminal of the AC supply include a rectifier and a resistor in series, and a parallel combination of the electric heater in series with a rectifier and a resistance thermometer in series with a rectifier, said resistance thermometer being associated with said actuator.

UNITED STATES PATENT OFFICE
CERTIFICATE OF CORRECTION

Patent No. __3,546,437__     Dated __December 8, 1970__

Inventor(s) __PETER BRUNO STEGHART__

It is certified that error appears in the above-identified patent and that said Letters Patent are hereby corrected as shown below:

CLAIM 9, lines 18 and 19, cancel "a mechanical link connecting across the potentiometer".

SIGNED AND SEALED

FEB 23 1971

(SEAL)
Attest:

Edward M. Fletcher, Jr.
Attesting Officer

WILLIAM E. SCHUYLER, JR
Commissioner of Patents

FORM PO-1050 (10-69)